(12) United States Patent
Obara et al.

(10) Patent No.: US 11,153,954 B2
(45) Date of Patent: Oct. 19, 2021

(54) INFORMATION PROCESSING DEVICE, LIGHTING SYSTEM, VEHICLE, AND LIGHTING CONTROL METHOD

(71) Applicant: TOYOTA JIDOSHA KABUSHIKI KAISHA, Aichi-ken (JP)

(72) Inventors: Ryohei Obara, Nagakute (JP); Masaki Ito, Toyota (JP); Makoto Kakuchi, Toyota (JP); Mutsumi Matsuura, Okazaki (JP); Hiroaki Sugiyama, Nagoya (JP); Yuichi Tashiro, Owariasahi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 91 days.

(21) Appl. No.: 16/683,295

(22) Filed: Nov. 14, 2019

(65) Prior Publication Data
US 2020/0163180 A1 May 21, 2020

(30) Foreign Application Priority Data
Nov. 16, 2018 (JP) ............................. JP2018-215769

(51) Int. Cl.
*B60Q 1/04* (2006.01)
*B60Q 1/26* (2006.01)
*H05B 47/19* (2020.01)

(52) U.S. Cl.
CPC ............... *H05B 47/19* (2020.01); *B60Q 1/04* (2013.01); *B60Q 1/26* (2013.01)

(58) Field of Classification Search
None
See application file for complete search history.

(56) References Cited

U.S. PATENT DOCUMENTS

2018/0319324 A1* 11/2018 Liu ....................... G08G 1/0962

FOREIGN PATENT DOCUMENTS

| EP | 2636560 A1 | 9/2013 |
|---|---|---|
| JP | 2005-317451 A | 11/2005 |
| JP | 2010-205473 A | 9/2010 |

OTHER PUBLICATIONS

Ministry of Land, Infrastructure, Transport and Tourism, "Ultra-small Vehicles", [online], Nov. 5, 2018, Internet <URL:http://www.mlit.go.jp/jidosha/jidosha_fr1_000043.html>, retrieved Oct. 18, 2019, 3pp.

* cited by examiner

*Primary Examiner* — Dedei K Hammond
(74) *Attorney, Agent, or Firm* — Hauptman Ham, LLP (57) ABSTRACT

An information processing device includes a storage unit configured to store area information for designating an area in which a lighting device is to be illuminated and illuminating time period information for designating a time period in which the lighting device is to be illuminated; and a first processor configured to acquire a current position of each of a plurality of vehicles, to extract at least one vehicle of which the current position is in the area from among the plurality of vehicles, and to instruct the at least one extracted vehicle to illuminate the lighting device in the time period.

13 Claims, 8 Drawing Sheets

INFORMATION PROCESSING DEVICE, LIGHTING SYSTEM, VEHICLE, AND LIGHTING CONTROL METHOD

INCORPORATION BY REFERENCE

The disclosure of Japanese Patent Application No. 2018-215769 filed on Nov. 16, 2018 including the specification, drawings and abstract is incorporated herein by reference in its entirety.

BACKGROUND

1. Technical Field

The disclosure relates to an information processing device, a lighting system, a vehicle, and a lighting control method.

2. Description of Related Art

Currently, ultra-small vehicles with a riding capacity of one or two persons, which are more compact than general automobiles and are called micro-compact mobility vehicles, are known. A micro-compact mobility vehicle has an excellent environmental performance and is expected to be widely used as simple transportation in local communities.

SUMMARY

Since rural areas include less facilities or lighting, there are many areas which are dark in the night time in comparison with urban areas. Since rural areas are large but have a small number of residents, it is difficult for persons to be aware of crime. In consideration of an aging society in the future, there is demand for robust anticrime measures in rural areas.

Consideration has been given to arranging vehicles such as micro-compact mobility vehicles in rural areas such as the countryside in addition to urban areas and using the vehicles as important transportation in areas having poor (inconvenient) transportation, in the near future. Therefore, it is considered that more secure and safer societies can be constructed by taking anticrime measures using vehicles such as micro-compact mobility vehicles in rural areas.

Therefore, the disclosure provides a technique that makes it possible to take anticrime measures in a local area using vehicles.

An aspect of the disclosure relates to an information processing device including a storage unit configured to store area information for designating an area in which a lighting device is to be illuminated and illuminating time period information for designating a time period in which the lighting device is to be illuminated; and a first processor configured to acquire a current position of each of a plurality of vehicles, to extract at least one vehicle of which the current position is in the area from among the plurality of vehicles, and to instruct the at least one extracted vehicle to illuminate the lighting device in the time period.

According to the aspect of the disclosure, it is possible to provide a technique that makes it possible to take anticrime measures in a local area using vehicles.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Exemplary embodiments of the disclosure will be described below with reference to the accompanying drawings. In the drawings, elements which are referred to by the same reference signs are identical to each other or have the same configuration.

Figure 1:
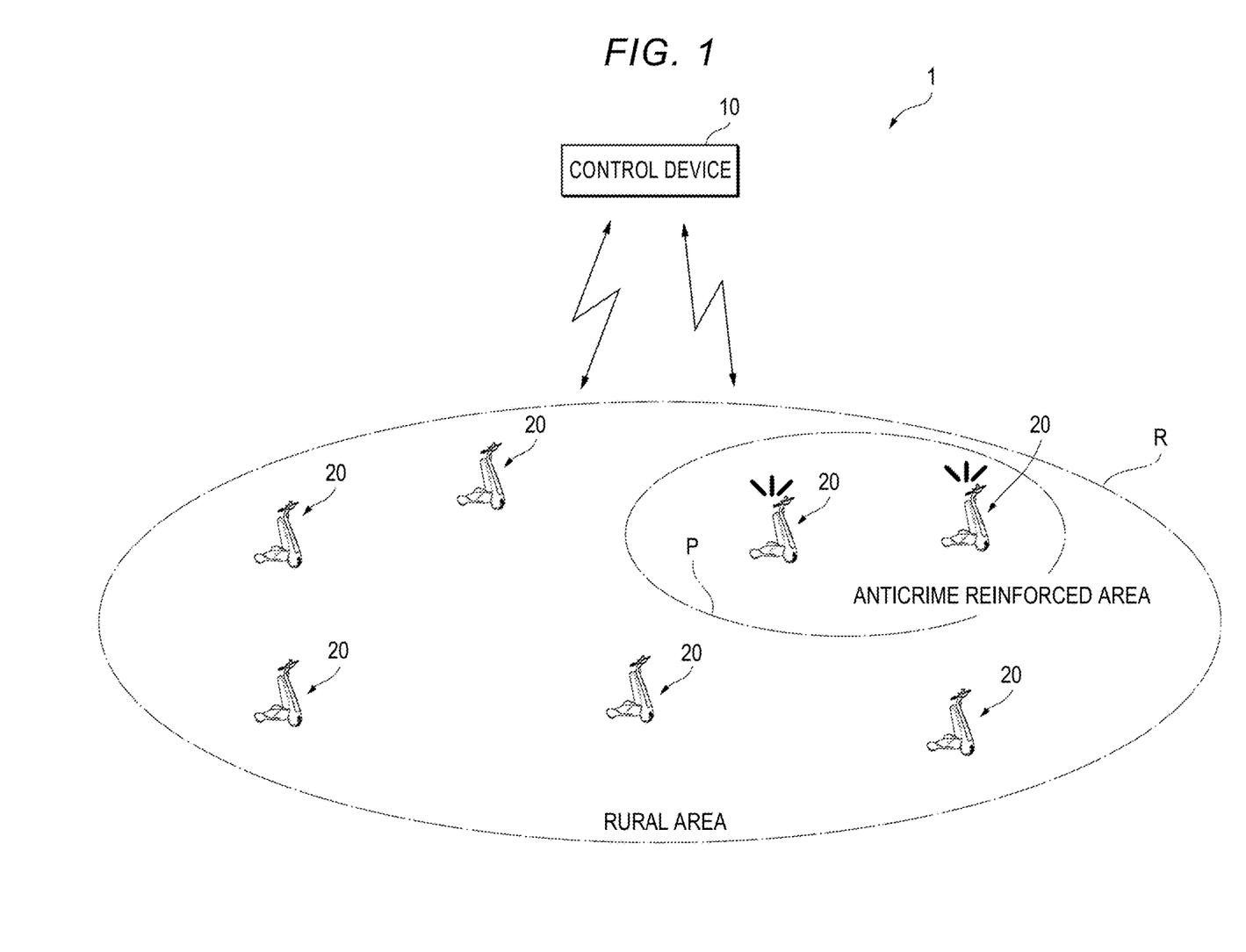
FIG. 1 is a diagram illustrating an example of a configuration of a lighting system according to a first embodiment.

FIG. 1 is a diagram illustrating an example of a system configuration of a lighting system 1 according to a first embodiment. The lighting system 1 includes a control device 10 and at least one vehicle 20. The control device 10 and the vehicles 20 can communicate with each other in a wireless manner.

In a rural area R, at least one anticrime reinforced area P is set. An anticrime reinforced area P is an area which is designated to reinforce anticrime measures, for example, by a public institution that manages the rural area R. The position and the size of the anticrime reinforced area P can be set to any position and any size. For example, it is assumed that a range within a radius of several hundreds of meters from a place in which an incident such as snatching often occurs is designated as the anticrime reinforced area P. The size of the rural area R can be set to any size. For example, the size of the rural area R may be a size corresponding to one prefectural region or may be a size corresponding to one municipal region.

The control device 10 is an information processing device that controls turning-on of a lighting device which is provided in a vehicle 20 in the rural area R. The control device 10 has a function of acquiring current positions of a plurality of vehicles 20 in the rural area R and instructing the vehicle(s) 20 in the anticrime reinforced area P among the plurality of vehicles 20 to illuminate the lighting device(s) of the vehicle(s) 20 mainly in the night time.

The vehicle 20 is a micro-compact mobility vehicle and is disposed for transportation in the rural area R. A micro-compact mobility vehicle is an ultra-small vehicle with a riding capacity of one or two persons, which is more compact than general automobiles. The vehicle 20 has a large-capacity battery mounted therein and moves mainly with power of a motor. The vehicle 20 includes a lighting device that can brightly illuminate the surroundings.

The vehicle 20 may be a micro-compact mobility vehicle which is owned by a person or may be a sharing type micro-compact mobility vehicle which is rented to regional residents by a public institution, a company, or the like. The sharing type micro-compact mobility vehicles are provided and arranged in rental stations and are rented to users who want to rent them with or without compensation. The rental stations are classified into two types of stations, that is, a station having a charging function and a station having no charging function. In the case of the vehicle 20 owned by a person, it is assumed that the owner of the vehicle 20 has approved (permitted) the vehicle 20 to be used in the lighting system 1, in advance.

Figure 2:
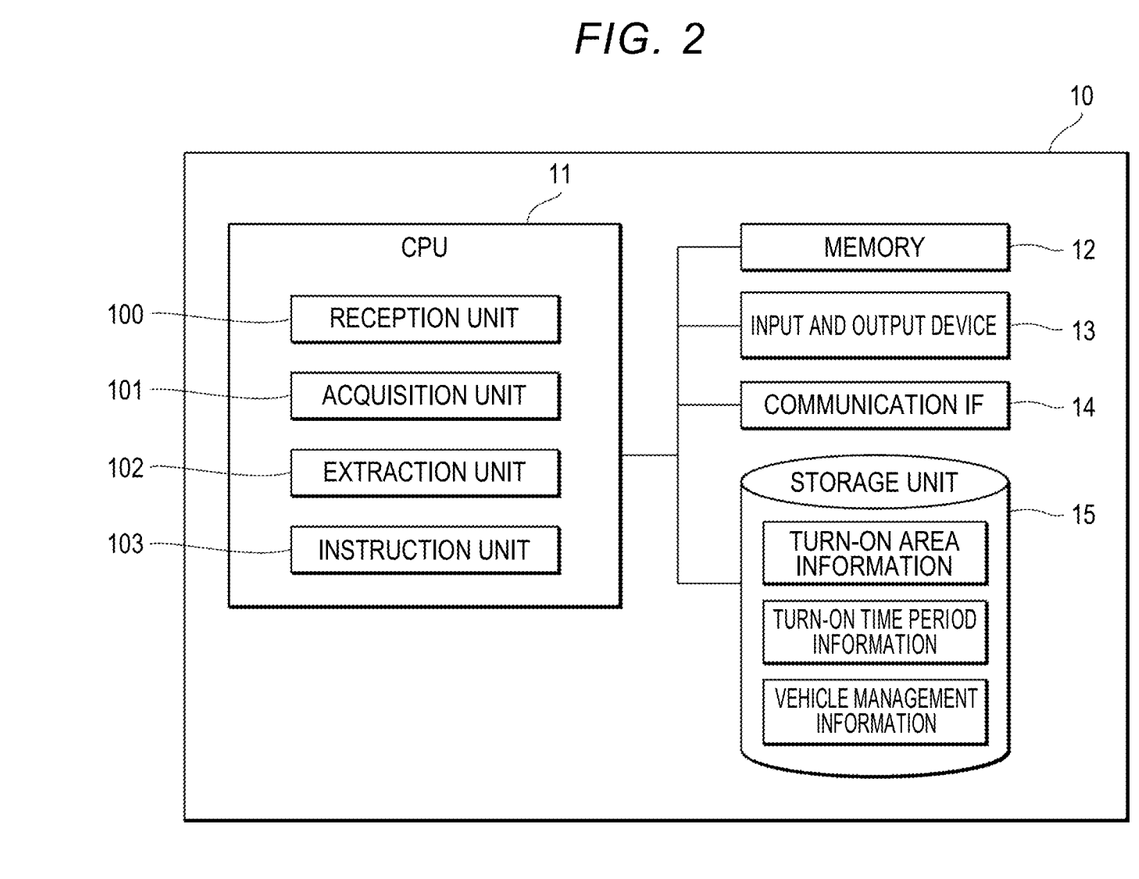
FIG. 2 is a diagram illustrating an example of a configuration of a control unit according to the first embodiment.

FIG. 2 is a diagram illustrating an example of a configuration of the control device 10 according to the first embodiment. The control device 10 includes a central processing unit (CPU) 11, a memory 12, an input and output device 13 that includes an input device (such as a keyboard, a touch panel, a mouse, or a microphone) that receives an input operation and an output device (such as a display or a speaker) that outputs information, a communication interface (IF) 14 that communicates with a vehicle 20, and a storage unit 15 such as a hard disk drive (HDD) and/or a solid state drive (SSD). The control device 10 may include at least one server or may include a cloud server. Illumination area information, illuminating time period information, and vehicle management information are stored in the storage unit 15.

The illumination area information includes information designating ranges of the anticrime reinforced areas P. The information designating the ranges of the anticrime reinforced areas P may be, for example, information in which a boundary of the anticrime reinforced areas P is expressed by a plurality of line segments or sequences of dots or information in which anticrime reinforced areas P are expressed by codes designating specific areas. The illumination area information may include information designating ranges of a plurality of anticrime reinforced areas P.

The illuminating time period information is information designating a time period in which the lighting device(s) of the vehicle(s) 20 is/are to be illuminated. The illuminating time period information includes information designating an illuminating start time and an illuminating end time. The illuminating start time and the illuminating end time may be, for example, information designating the times as time points, e.g., from 17:30 to 05:00, or information indirectly designating the illuminating start time and the illuminating end time, e.g., from sunset to sunrise or a time during which it is dark (a time in which a brightness measured by a vehicle 20 is equal to or less than a predetermined threshold value). In the illuminating time period information, different time periods may be designated depending on the anticrime reinforced areas P.

The vehicle management information is information for managing current positions of the vehicles 20. In the vehicle management information, vehicle IDs which are identifiers for uniquely identifying the vehicles 20 and information (for example, latitude and longitude) designating the current positions of the vehicles 20 are stored in correlation.

A reception unit 100, an acquisition unit 101, an extraction unit 102, and an instruction unit 103 are embodied by causing the CPU 11 (a first processor) of the control device 10 to execute a program stored in the memory 12 or the storage unit 15. The program may be stored in a storage medium. The storage medium having the program stored therein may be a non-transitory computer-readable medium. The non-transitory storage medium is not particularly limited and may be, for example, a storage medium such as a USB memory or a CD-ROM.

The reception unit 100 has a function of receiving an input of information on a range of an anticrime reinforced area P from an administrator of a public institution or the like and storing the received information in the illumination area information. The reception unit 100 also has a function of receiving an input of a time period in which the lighting devices of the vehicles 20 are to be illuminated from an administrator of a public institution or the like and storing the received time period in the illuminating time period information.

The acquisition unit 101 has a function of acquiring information indicating current positions of a plurality of vehicles 20 from the vehicles 20 and storing the acquired information in the vehicle management information.

The extraction unit 102 has a function of extracting at least one vehicle 20 of which the current position is in the anticrime reinforced area P from among the plurality of vehicles 20 of which the current positions have been acquired.

The instruction unit 103 has a function of instructing at least one vehicle 20 extracted by the extraction unit 102 to illuminate the lighting device in the time period designated by the illuminating time period information.

Figure 3:
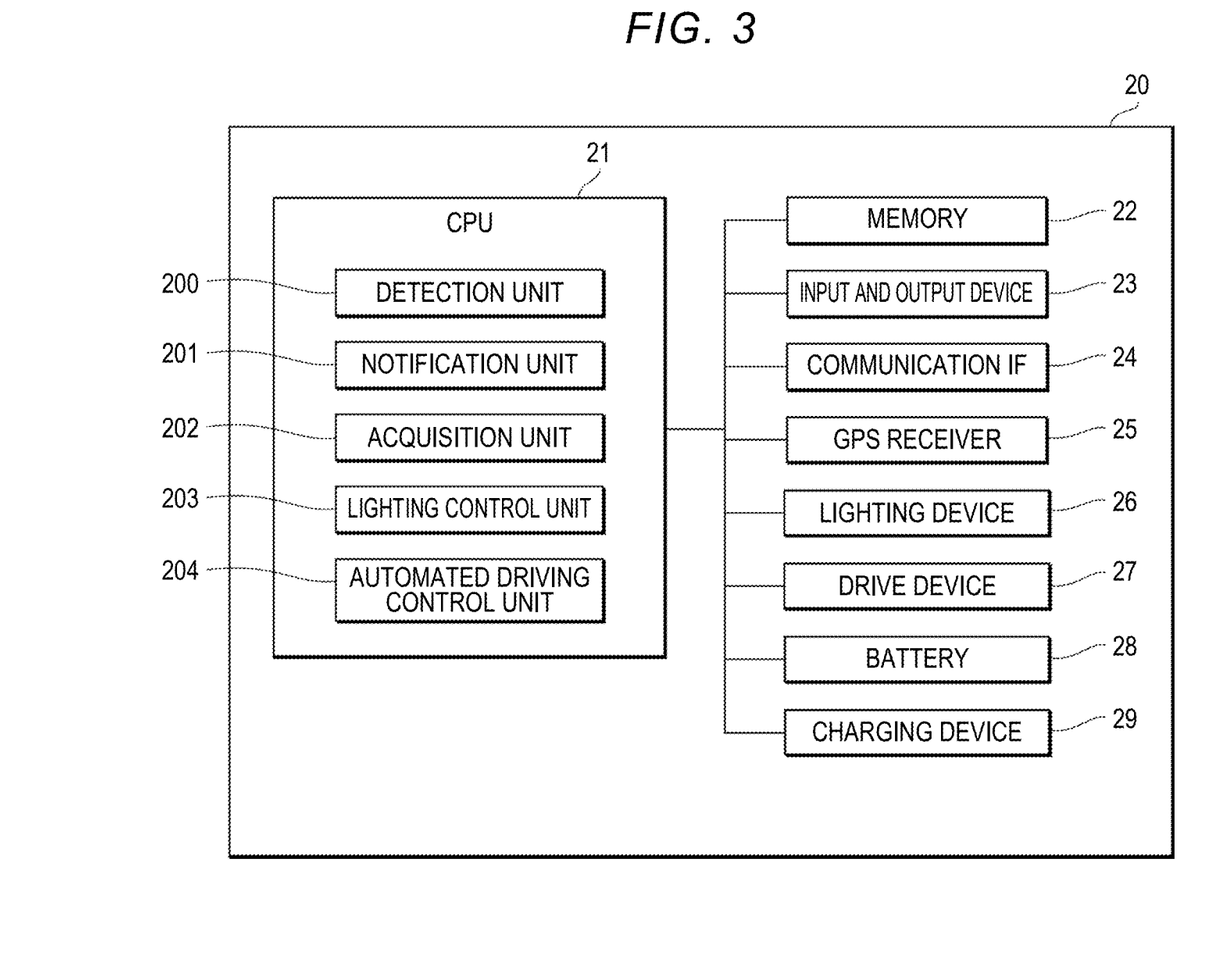
FIG. 3 is a diagram illustrating an example of a configuration of a vehicle according to the first embodiment.

FIG. 3 is a diagram illustrating an example of a configuration of a vehicle 20 according to the first embodiment. The vehicle 20 includes a CPU 21, a memory 22, an input and output device 23, a communication IF 24 that communicates with the control device 10, a GPS receiver 25 that receives signals of GPS satellites, a lighting device 26, a drive device 27, a battery 28, and a charging device 29. FIG. 3 illustrates the configuration of the vehicle 20, which is required to describe the first embodiment. The vehicle 20 also includes devices and the like which are not illustrated in FIG. 3.

The input and output device 23 includes an input device (such as a touch panel and a microphone) that receives various operations from a user who is in the vehicle 20 and an output device (such as a display and a speaker) that outputs information.

The lighting device 26 is a light that is turned on (i.e., that is illuminated) when an instruction has been received from the control device 10. The lighting device 26 may be a headlamp that is installed on the front surface of the vehicle 20 or may be an anticrime lamp other than a headlamp.

The drive device 27 includes various devices which are required to allow the vehicle 20 to travel, such as tires, a motor, and a transmission. The battery 28 supplies electric power required for operation of the vehicle 20. The charging device 29 is a device that is supplied with electric power from an external power supply, and charges the battery 28.

A detection unit 200, a notification unit 201, an acquisition unit 202, a lighting control unit 203, and an automated driving control unit 204 are embodied by causing the CPU 21 (a second processor) of the vehicle 20 to execute a program stored in the memory 22. The program may be stored in a storage medium. The storage medium having the program stored therein may be a non-transitory computer-readable medium. The non-transitory storage medium is not particularly limited and may be, for example, a storage medium such as a USB memory or a CD-ROM.

The detection unit 200 has a function of detecting a current position of the vehicle 20 using the GPS receiver 25. The notification unit 201 has a function of notifying the control device 10 of information designating the current position detected by the detection unit 200. The acquisition unit 202 has a function of acquiring information designating a time period in which the lighting device 26 is to be illuminated, from the control device 10. The lighting control unit 203 has a function of illuminating the lighting device 26 in the designated time period, when the time period in which the lighting device 26 is to be illuminated is designated by the control device 10.

The automated driving control unit 204 has a function of executing a variety of controls which are required to perform automated driving of the vehicle 20. For example, the automated driving control unit 204 executes the control for automated movement to a position designated by a user who is in the vehicle or automatic movement to a position designated by an external device when a user is not in the vehicle.

Figure 4:
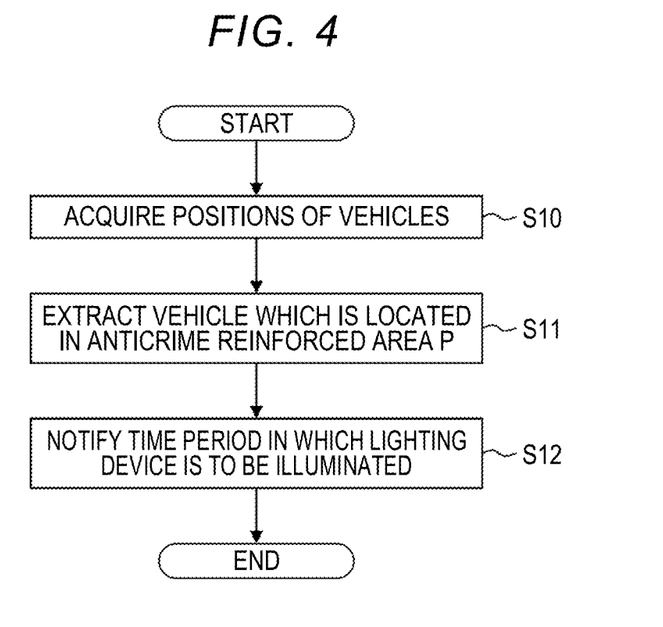
FIG. 4 is a flowchart illustrating an example of a process routine which is performed by the control unit according to the first embodiment.

FIG. 4 is a flowchart illustrating an example of a process routine which is performed by the control device 10 according to the first embodiment. The control device 10 instructs at least one vehicle 20 which is in an anticrime reinforced area P among the vehicles 20 which are managed by the control device 10 in a rural area R to illuminate the lighting device 26 in an illuminating time period by performing the process routine illustrated in FIG. 4.

First, the acquisition unit 101 acquires position information indicating current positions from the vehicles 20 by communicating with the vehicles 20 which are managed by the control device 10, and stores the acquired position information in the vehicle management information (S10). Then, the extraction unit 102 acquires a range of an anticrime reinforced area P from illumination area information and extracts at least one vehicle 20 of which the current position acquired in the process of Step S10 is in the range of the anticrime reinforced area P, from among the vehicles 20 (S11). Subsequently, the instruction unit 103 acquires a time period in which the lighting device 26 is to be illuminated from the illuminating time period information, and notifies the at least one extracted vehicle 20 of information designating the time period in which the lighting device 26 is to be illuminated (S12).

The lighting control unit 203 of the vehicle 20 that has received the information designating the time period in which the lighting device 26 is to be illuminated turns on the lighting device 26 of the vehicle 20 at the illuminating start time which is designated by the information, and turns off the lighting device 26 at the illuminating end time which is designated by the information.

Figure 5:
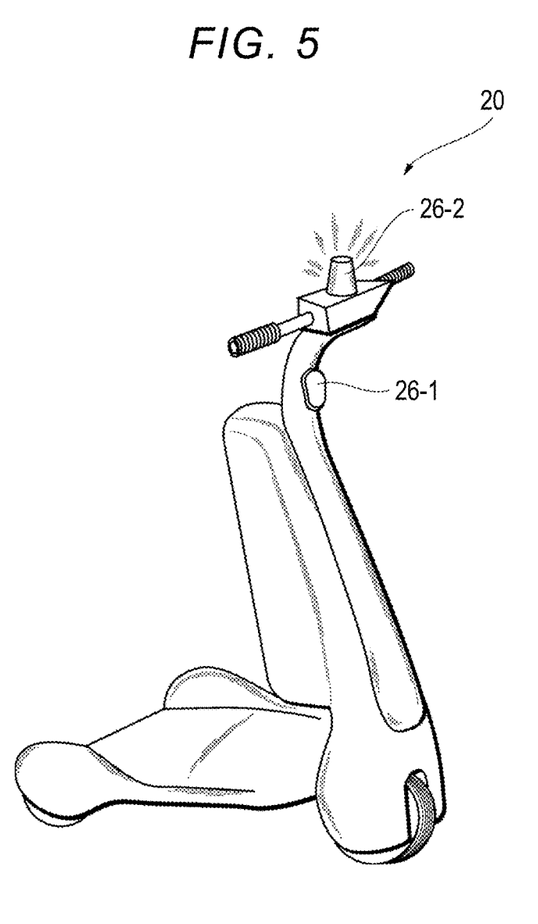
FIG. 5 is a diagram illustrating a specific example of a vehicle.

FIG. 5 is a diagram illustrating a specific example of the vehicle 20. The vehicle 20 illustrated in FIG. 5 is a micro-compact mobility vehicle with a riding capacity of one person. In FIG. 5, a lighting device 26-1 is a specific example of the headlamp of the vehicle 20, and a lighting device 26-2 is a specific example of the anticrime lamp. Since an anticrime lamp is desired to emit light so as to be visible from a distant place, an optical axis thereof may be set to extend above a horizontal surface. The direction of the optical axis may be changed automatically such that there is no shielding close to the optical axis and light reaches a distant place.

Figure 6:
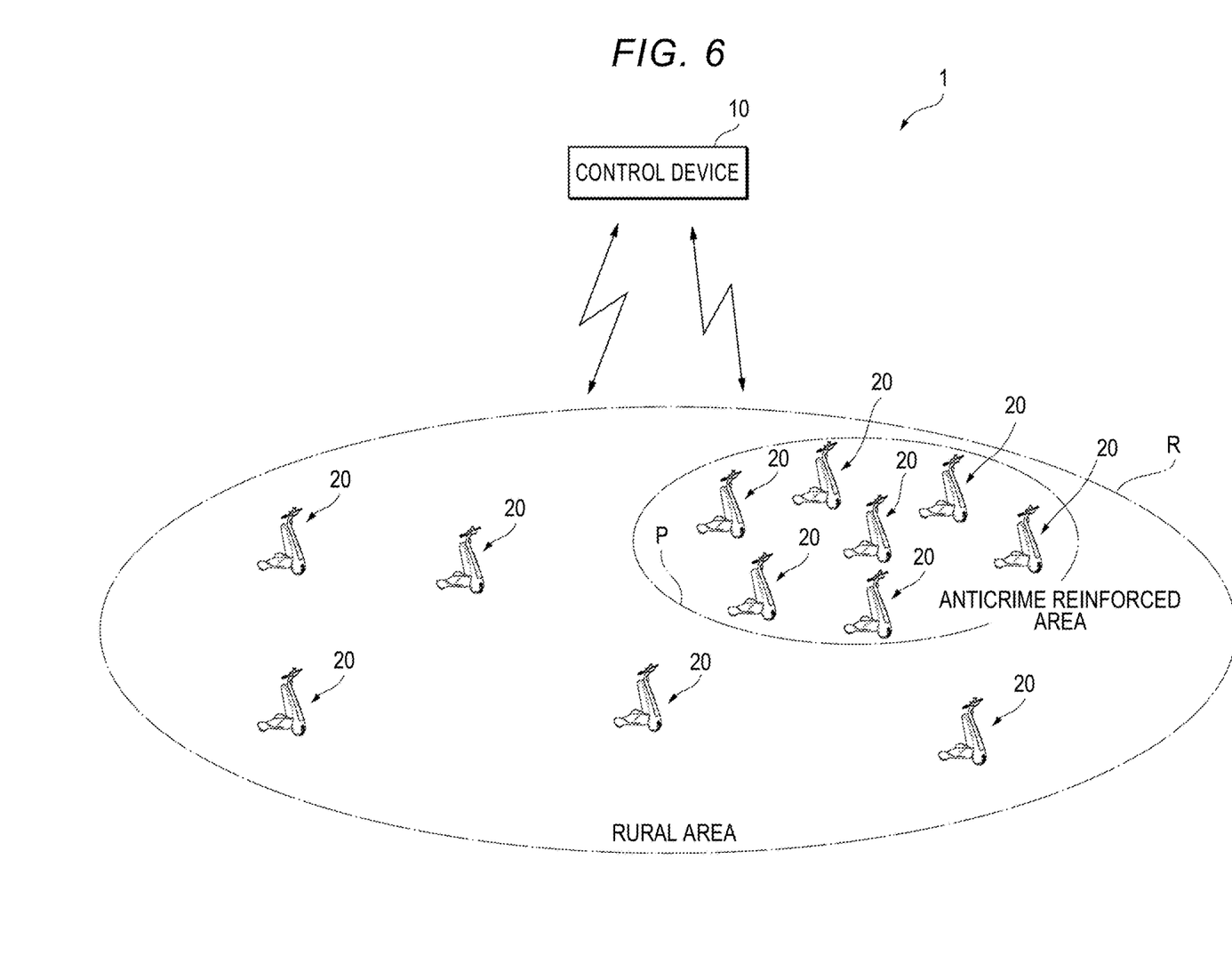
FIG. 6 is a diagram illustrating an example of a configuration of a lighting system according to a second embodiment.

FIG. 6 is a diagram illustrating an example of a system configuration of a lighting system 1 according to a second embodiment. In the first embodiment, at least one vehicle 20 which is located in an anticrime reinforced area P is instructed to illuminate its lighting device 26. However, when the number of vehicles 20 which are located in the anticrime reinforced area P is small, lighting may not be visible from a distant place due to an insufficient quantity of light, the surroundings may not be able to be illuminated brightly, and thus an anticrime effect may not be able to be appropriately achieved. When hardly any anticrime effect is obtained but the lighting devices 26 are illuminated, the batteries 28 of the vehicles 20 are uselessly consumed, which is not efficient.

Therefore, in the second embodiment, when there are a predetermined number of vehicles 20 in an anticrime reinforced area P, the control device 10 may instruct the vehicles 20 which are located in the anticrime reinforced area P to illuminate the lighting devices 26. When the number of vehicles 20 in the anticrime reinforced area P is small, the control device 10 may collect a predetermined number of vehicles 20 in the anticrime reinforced area P by instructing at least one vehicle 20 outside the anticrime reinforced area P to move into the anticrime reinforced area P.

By causing a predetermined number of, or more vehicles 20 to illuminate the lighting devices 26 in the anticrime reinforced area P, it is possible to secure a necessary quantity of light, the lighting is visible from a distant place, and the surroundings are brightly illustrated, whereby it is possible to achieve a large anticrime effect.

The configuration of the control device 10 according to the second embodiment will be described below. Details which are not particularly mentioned are the same as in the first embodiment.

The instruction unit 103 has a function of instructing at least one extracted vehicle 20 to illuminate the lighting device 26 in the illuminating time period when the number of the at least one vehicle 20 extracted by the extraction unit 102 and located in the anticrime reinforced area P is equal to or greater than a predetermined number.

The instruction unit 103 may instruct at least one vehicle 20 which is located outside the anticrime reinforced area P to move into the anticrime reinforced area P when the number of the at least one extracted vehicle 20 is less than a predetermined number.

Figure 7:
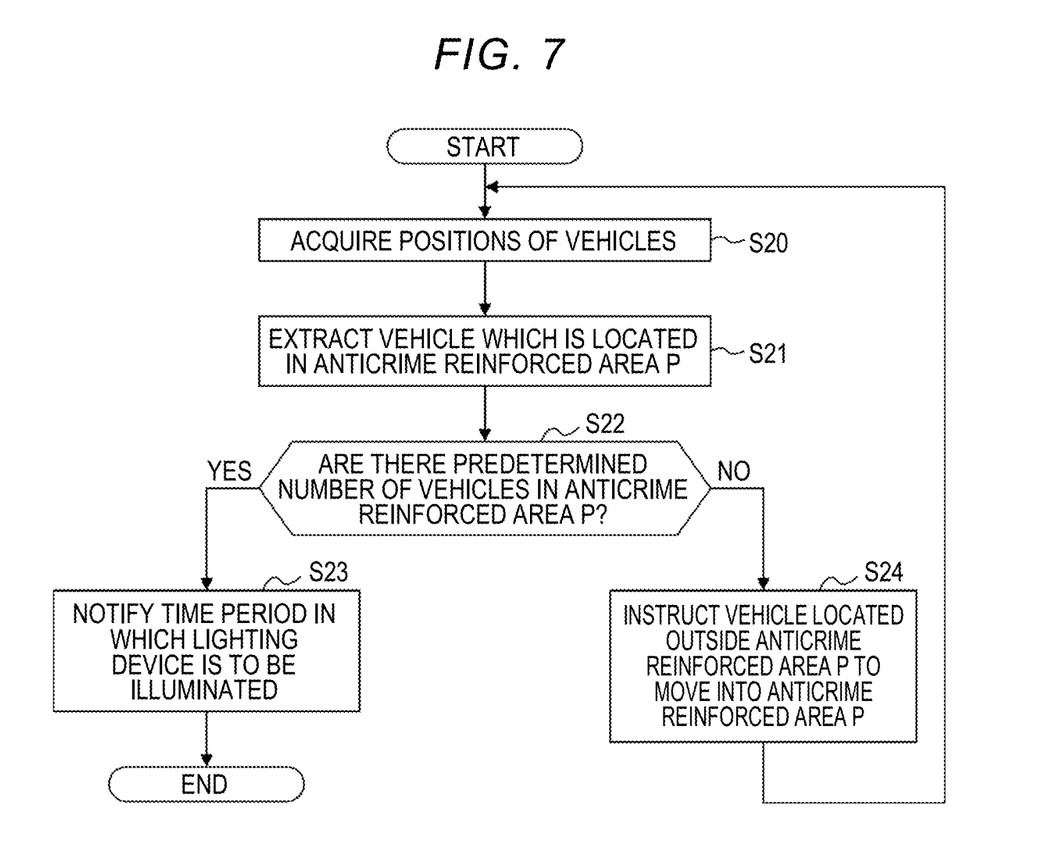
FIG. 7 is a flowchart illustrating an example of a process routine which is performed by a control unit according to the second embodiment.

FIG. 7 is a flowchart illustrating an example of a process routine which is performed by the control device 10 according to the second embodiment.

First, the acquisition unit 101 acquires position information indicating a current position from each vehicle 20 by communicating with the vehicles 20 which are managed by the control device 10, and stores the acquired position information in the vehicle management information (S20). Then, the extraction unit 102 acquires a range of an anticrime reinforced area P from illumination area information and extracts at least one vehicle 20 of which the current position acquired in the process of Step S20 is in the range of the anticrime reinforced area P (S21), from among the vehicles 20.

Subsequently, the instruction unit 103 determines whether a predetermined number of vehicles 20 are located in the anticrime reinforced area P. The process of Step S23 is performed when the predetermined number of vehicles 20 are located therein (YES in S22), and the process of Step S24 is performed when the predetermined number of vehicles 20 are not located therein (NO in S22).

The instruction unit 103 acquires a time period in which the lighting device 26 is to be illuminated, from the illuminating time period information. The instruction unit 103 notifies the at least one vehicle 20 extracted in the process of Step S21 of the acquired information designating the time period in which the lighting device 26 is to be illuminated (S23).

The instruction unit 103 instructs at least one vehicle 20 which is located outside the anticrime reinforced area P to move into the anticrime reinforced area P (S24). The control device 10 repeatedly performs the processes of Steps S20 to S22 again and performs the process of Step S23 at a time point at which the predetermined number of vehicles 20 are collected in the anticrime reinforced area P.

The number of vehicles in the anticrime reinforced area P will be described below. As described above, in the second embodiment, when a predetermined number of vehicles 20 are located in the anticrime reinforced area P, the lighting devices 26 of the vehicles 20 are illuminated in order to secure a necessary quantity of light.

Here, the predetermined number may be a number which is designated by an administrator of a public institution or the like. Specifically, the reception unit 100 may receive an input of a predetermined number of vehicles which are to be disposed in the anticrime reinforced area P from an administrator or the like and store the received number in the illumination area information. In the process of Step S22, the instruction unit 103 may acquire information designating the predetermined number of vehicles which are to be located in the anticrime reinforced area P by accessing the illumination area information. The administrator may arbitrarily designate the predetermined number depending on the size and/or characteristics of the anticrime reinforced area P.

The predetermined number of vehicles may be automatically determined by the instruction unit 103 of the control device 10. For example, the number of vehicles 20 in which the lighting devices 26 are to be illuminated per unit area (for example, an area of 100 square meters) may be determined in advance, and the predetermined number of vehicles may be obtained by multiplying the area (i.e., size) of the anticrime reinforced area P by the number of vehicles 20 per unit area. For example, when the size of the anticrime reinforced area P is an area of 300 square meters, one unit area is an area of 100 square meters, and the number of vehicles 20 per unit area is set to 10, the predetermined number of vehicles is 30.

The number of vehicles 20 per unit area may vary depending on the anticrime reinforced area P. For example, in a case where an area is designated as the anticrime reinforced area P for the reason of frequent occurrence of an incident, the number of vehicles 20 per unit area may be increased.

A lighting control method in consideration of remaining (residual) capacities of the batteries of vehicles will be described below. It is thought that a vehicle 20 which can be supplied with electric power from an external power supply in a charging station or the like does not consume electric power in the battery 28 even when the lighting device 26 thereof is kept illuminated. However, a vehicle 20 which is not supplied with electric power from an external power supply may consume electric power in the battery 28 when the lighting device 26 thereof is kept illuminated for a long time. As a result, the vehicle 20 cannot be used by a user the next day. Accordingly, the control device 10 may instruct each vehicle 20 to illuminate (i.e., turn on) the lighting device 26 in consideration of the remaining capacity of the battery of the vehicle 20.

A first turn-on control method will be described below. After performing the process of Step S23 in FIG. 7, the control device 10 may monitor remaining capacities of the batteries 28 of the vehicles 20 located in the anticrime reinforced area P, instruct a vehicle 20 in which the remaining capacity of the battery is small to turn off its lighting device 26, and instruct a reserve vehicle 20 to turn on its lighting device 26. In order to realize this, the acquisition unit 101 acquires the remaining capacities of the batteries from the vehicles 20 by communicating with the vehicles 20.

Specifically, the instruction unit 103 monitors the remaining capacities of the batteries of the vehicles 20 acquired by the acquisition unit 101. In the anticrime reinforced area P, there may be a vehicle 20 (a first vehicle) in which the lighting device 26 is illuminated without being supplied with electric power from an external power supply and the remaining capacity of the battery 28 is equal to or less than a first threshold value and a vehicle 20 (a second vehicle) in which the lighting device 26 is not illuminated and the remaining capacity of the battery 28 is equal to or greater than a second threshold value that is greater than the first threshold value. In this case, the instruction unit 103 instructs the vehicle 20 in which the remaining capacity of the battery 28 is equal to or less than the first threshold value to turn off its lighting device and instructs the vehicle 20 in which the remaining capacity of the battery 28 is equal to or greater than the second threshold value to turn on its lighting device 26.

In order to enable this processing, the "predetermined number of vehicles" may include a "vehicle 20 in which the remaining capacity of the battery 28 is equal to or greater than the second threshold value greater than the first threshold value" as a reserve vehicle 20. In the process of Step S23 in FIG. 7, the instruction unit 103 may notify information designating the time period in which the lighting devices 26 are to be illuminated to the vehicles 20 other than a vehicle 20 which is to be secured as a reserve vehicle among the plurality of vehicles 20 extracted in the process of Step S21.

A second turn-on control method will be described below. In the process of Step S23 in FIG. 7, the control device 10 may provide instructions to the vehicles 20 which are located in the anticrime reinforced area P such that the illuminating time period in which the lighting device 26 is illuminated varies among the vehicles 20, within the range of times in which the lighting devices 26 of the vehicles 20 can be illuminated. The time in which the lighting device 26 of each vehicle 20 can be illuminated may be set to, for example, a time until the remaining capacity of the battery 28 becomes equal to or less than a predetermined threshold value (for example, ⅓ of the battery capacity) in a case where the lighting device 26 is kept illuminated while the vehicle is stopped.

Specifically, first, the acquisition unit 101 acquires a time in which a lighting device 26 of each of a plurality of vehicles 20 in an anticrime reinforced area P is able to be illuminated. The acquisition unit 101 may acquire information specifically designating the time (for example, 2 hours or 4 hours) in which the lighting device 26 is able to be illuminated (i.e., can be kept illuminated) from each vehicle 20 or may acquire information indirectly designating the time in which the lighting device 26 can be kept illuminated, such as a remaining capacity of a battery, from the vehicle 20. In the latter case, the time in which the lighting device 26 of each vehicle 20 can be kept illuminated may be calculated using a predetermined calculation expression for converting a remaining capacity of a battery into a time in which the lighting device 26 can be kept illuminated.

Then, the instruction unit 103 determines a time period for each vehicle 20 in which the vehicle 20 is instructed to illuminate its lighting device 26, within at least the range of the time in which the lighting device 26 of the vehicle 20 is able to be illuminated, based on the time in which the lighting device 26 of the vehicle 20 is able to be illuminated and the illuminating time period designated by the illuminating time period information, and the instruction unit 103 instructs each vehicle 20 to illuminate its lighting device 26 in the determined time period for the vehicle 20.

For example, there may be a case where a lighting device 26 of a vehicle 20A can be illuminated for 4 hours, a lighting device 26 of a vehicle 20B can be illuminated for 3 hours, and the illuminating time period designated by the illuminating time period information ranges from 22:00 to 05:00. In this case, the control device 10 may instruct the vehicle 20A to illuminate its lighting device 26 for 4 hours from 22:00 to 02:00 and instruct the vehicle 20B to illuminate its lighting device 26 for 3 hours from 02:00 to 05:00.

The instruction unit 103 may determine a time period in which a lighting device 26 of each vehicle 20 is illuminated such that the time periods in which the lighting devices 26 of the vehicles 20 are illuminated are distributed over the whole illuminating time period within at least the range of times in which the lighting devices 26 of the vehicles 20 can be illuminated, based on the times in which the lighting devices 26 of the vehicles 20 can be illuminated and the illuminating time period designated by the illuminating time period information.

In the first embodiment and the second embodiment, the control device 10 controls turning-on and turning-off of the lighting devices 26 of the vehicles 20, but each vehicle 20 controls turning-on and turning-off of its lighting device 26 in a third embodiment.

Figure 8:
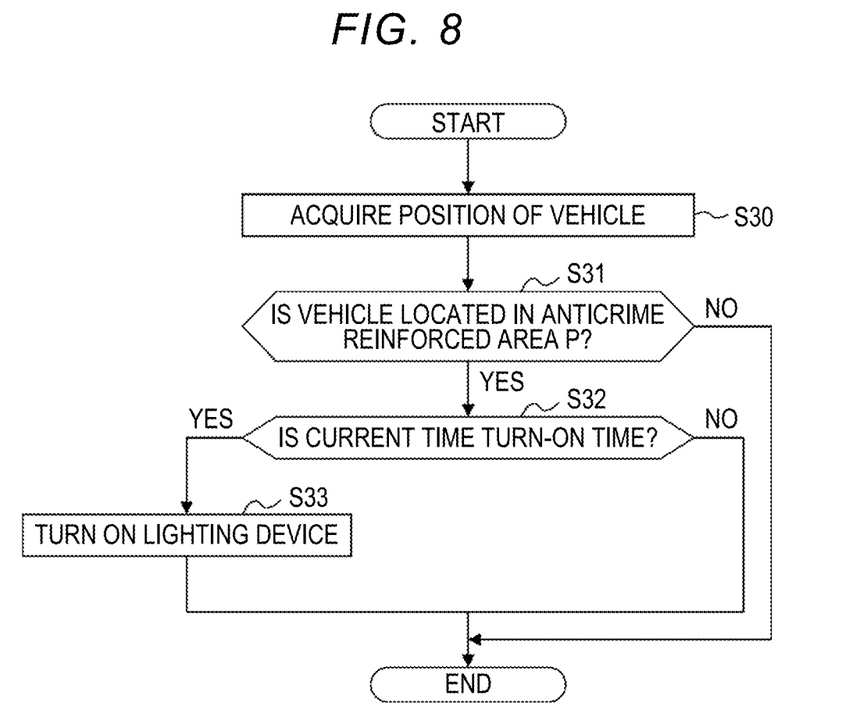
FIG. 8 is a flowchart illustrating a process routine which is performed by a vehicle according to a third embodiment.

FIG. 8 is a flowchart illustrating a process routine which is performed by a vehicle 20 according to the third embodiment. It is assumed that illumination area information and illuminating time period information, which have been described above in the first embodiment and the second embodiment, are stored in the memory 22 of each vehicle 20. It is assumed that each vehicle 20 repeatedly performs the processes of Steps S30 to S33 at predetermined intervals (for example, intervals of 1 minute or intervals of 5 minutes).

First, the detection unit 200 acquires a current position of the vehicle 20 using the GPS receiver 25 (S30). Then, the acquisition unit 202 acquires a range of an anticrime reinforced area P from the illumination area information. Subsequently, the lighting control unit 203 determines whether the current position of the vehicle 20 is in the anticrime reinforced area P (S31). The process routine ends when the current position is not in the anticrime reinforced area P (NO in S31), and the process routine progresses to Step S32 when the current position is in the anticrime reinforced area P (YES in S31).

Subsequently, the acquisition unit 202 acquires a time period in which the lighting device 26 is to be illuminated from the illuminating time period information. Subsequently, the lighting control unit 203 determines whether a current time is included in the time period in which the lighting device 26 is to be illuminated (S32). When the current time is included in the time period in which the lighting device 26 is to be illuminated, the lighting control unit 203 turns on (i.e., illuminates) the lighting device 26 (S33). When the current time is not included in the time period in which the lighting device 26 is to be illuminated, the lighting control unit 203 ends the process routine. The lighting control unit 203 may turn on (i.e., illuminate) the lighting device 26 when the remaining capacity of the battery mounted in the vehicle 20 is equal to or greater than a predetermined remaining capacity or the vehicle 20 is being supplied with electric power from an external power supply.

According to the above-mentioned embodiments, since lighting devices 26 of vehicles 20 can be illuminated in an anticrime reinforced area P, it is possible to take anticrime measures in a local area using the vehicles 20.

According to the second embodiment, since a predetermined number of, or more vehicles 20 turn on (i.e., illuminate) their lighting devices 26 in an anticrime reinforced area P, a necessary quantity of light can be secured, lighting is visible from a distant place, and the surroundings can be brightly illuminated, whereby it is possible to achieve a high anticrime effect. In addition, it is possible to instruct vehicles 20 to turn on or turn off their lighting devices 26 in consideration of remaining capacities of the batteries thereof and to control the vehicles 20 such that batteries thereof do not become empty.

According to the third embodiment, since a vehicle 20 controls turning-on of its lighting device 26, turning-on and turning-off of the lighting device 26 can be controlled even in an area in which the vehicle cannot communicate with the control device 10. Accordingly, even in an area in which a vehicle 20 cannot communicate with the control device 10, it is possible to take anticrime measures in local areas.

The above-mentioned embodiments are for facilitating understanding of the disclosure, and the disclosure is not limited to the above-mentioned embodiments. The flowcharts and sequences described above in the embodiments, elements of the embodiments, and arrangements, materials, conditions, shapes, sizes, and the like thereof are not limited to those described in the embodiments and can be appropriately modified. Elements described in different embodiments can be partially replaced or combined with each other.

For example, in the embodiments, the control device 10 may manage an arbitrary area instead of a rural area R. Similarly, the control device 10 is not limited to a control device that manages an anticrime reinforced area P. For example, the control device 10 may manage lighting in an area using many lighting devices such as an event hall instead of an anticrime reinforced area P. That is, an anticrime reinforced area P, an event hall, or the like may be referred to as an "area in which lighting devices are illuminated."

In the embodiments, a vehicle 20 is not limited to a micro-compact mobility vehicle. For example, any vehicle may be employed as the vehicle 20, as long as a lighting device 26 is mounted in the vehicle 20.

The processes which are performed by the control device 10 in the embodiments may be performed by the vehicle 20 instead of the control device 10. For example, by causing any one vehicle 20 among vehicles 20 in a rural area R to perform the same process routine as the process routine performed by the control device 10, the processes can be realized. In this case, each of the control device 10 and the vehicle 20 may be referred to as an "information processing device."

What is claimed is:

1. An information processing device comprising:
a storage unit configured to store area information for designating an area in which a lighting device is to be illuminated and illuminating time period information for designating a time period in which the lighting device is to be illuminated; and
a first processor configured to acquire a current position of each of a plurality of vehicles, to extract at least one vehicle of which the current position is in the area from among the plurality of vehicles, and to instruct the at least one extracted vehicle to illuminate the lighting device in the time period.

2. The information processing device according to claim 1, wherein the first processor is configured to instruct the at least one extracted vehicle to illuminate the lighting device in the time period when the number of the at least one extracted vehicle is equal to or greater than a predetermined number.

3. The information processing device according to claim 2, wherein the predetermined number is obtained by multiplying the number of vehicles in which the lighting devices are to be illuminated per unit area by a size of the area.

4. The information processing device according to claim 2, wherein the first processor is configured to instruct a vehicle located outside the area to move into the area when the number of the at least one extracted vehicle is less than the predetermined number.

5. The information processing device according to claim 1, wherein:
   the first processor is configured to acquire a remaining capacity of a battery in each of the plurality of vehicles; and
   the first processor is configured to instruct a first vehicle, in which the lighting device is illuminated and the remaining capacity of the battery is equal to or less than a first threshold value, to turn off the lighting device, and to instruct a second vehicle, in which the lighting device is not illuminated and the remaining capacity of the battery is equal to or greater than a second threshold value that is greater than the first threshold value, to turn on the lighting device in a case where the first vehicle and the second vehicle are located in the area.

6. The information processing device according to claim 1, wherein:
   the first processor is configured to acquire a time in which the lighting device of each of the plurality of vehicles is able to be illuminated;
   the first processor is configured to determine an illuminating time period for each of the plurality of vehicles in which the vehicle is instructed to illuminate the lighting device, within at least a range of the time in which the lighting device of the vehicle is able to be illuminated, based on the time in which the lighting device of the vehicle is able to be illuminated and the time period designated by the illuminating time period information; and
   the first processor is configured to instruct each of the plurality of vehicle to illuminate the lighting device in the determined illuminating time period for the vehicle.

7. The lighting control method according to claim 1, wherein illuminating the lighting device comprises illuminating the lighting device when a remaining capacity of a battery mounted in the vehicle is equal to or greater than a predetermined remaining capacity.

8. The lighting control method according to claim 1, wherein illuminating the lighting device comprises illuminating the lighting device when the vehicle is being supplied with electric power from an external power supply.

9. A lighting system comprising:
   an information processing device; and
   a plurality of vehicles,
   wherein the information processing device includes
      a storage unit configured to store area information for designating an area in which a lighting device is to be illuminated and illuminating time period information for designating a time period in which the lighting device is to be illuminated, and
      a first processor configured to acquire a current position of each of the plurality of vehicles, to extract at least one vehicle of which the current position is in the area from among the plurality of vehicles, and to instruct the at least one extracted vehicle to illuminate the lighting device in the time period, and
   wherein each of the plurality of vehicles includes a second processor configured to notify the information processing device of the current position of the vehicle and to illuminate the lighting device in the designated time period when the vehicle has been instructed by the information processing device.

10. A vehicle comprising
   a second processor configured to detect a current position, to acquire area information for designating an area in which a lighting device is to be illuminated and illuminating time period information for designating a time period in which the lighting device is to be illuminated, and to illuminate the lighting device when the current position is in the area and a current time is in the time period,
   wherein the second processor is configured to illuminate the lighting device when a remaining capacity of a battery mounted in the vehicle is equal to or greater than a predetermined remaining capacity or the vehicle is being supplied with electric power from an external power supply.

11. A lighting control method comprising:
   storing, by a control device, area information for designating an area in which a lighting device is to be illuminated and illuminating time period information for designating a time period in which the lighting device is to be illuminated, in a storage unit; and
   acquiring, by the control device, a current position of each of a plurality of vehicles;
   extracting, by the control device, at least one vehicle of which the current position is in the area from among the plurality of vehicles; and
   instructing, by the control device, the at least one extracted vehicle to illuminate the lighting device in the time period.

12. A lighting control method comprising: detecting, by a vehicle, a current position; acquiring, by the vehicle, area information for designating an area in which a lighting device is to be illuminated and illuminating time period information for designating a time period in which the lighting device is to be illuminated; and illuminating, by the vehicle, the lighting device when the current position is in the area and a current time is in the time period, wherein illuminating the lighting device comprises illuminating the lighting device when a remaining capacity of a battery mounted in the vehicle is equal to or greater than a predetermined remaining capacity or illuminating the lighting device when the vehicle is being supplied with electric power from an external power supply.

13. The lighting control method according to claim 12, wherein the time period in which the light device is to be illuminated is independent of sunset and sunrise.

* * * * *